United States Patent [19]
Diehl et al.

[11] 3,838,705
[45] Oct. 1, 1974

[54] HEAT RESPONSIVE SAFETY DEVICE FOR GATE VALVES

[75] Inventors: Robert J. Diehl, Houston, Tex.;
Robert L. Freeman, Metairie, La.

[73] Assignee: ACF Industries, Incorporated, New York, N.Y.

[22] Filed: Dec. 8, 1972

[21] Appl. No.: 313,288

[52] U.S. Cl. ............................................. 137/75
[51] Int. Cl. .......................................... F16k 17/38
[58] Field of Search ............................. 137/72–77; 122/504.1, 504.3; 220/89 B

[56] References Cited
UNITED STATES PATENTS

| | | | |
|---|---|---|---|
| 1,206,341 | 11/1916 | Leavitt | 137/72 X |
| 1,243,998 | 10/1917 | Smyly | 137/75 |
| 3,313,312 | 4/1967 | Weese | 137/75 |
| 3,659,624 | 5/1972 | Kelly et al. | 137/75 |
| 3,720,220 | 3/1973 | McMath | 137/75 |
| 3,734,115 | 5/1973 | McMath | 137/73 |

Primary Examiner—Henry T. Klinksiek
Assistant Examiner—Richard Gerard
Attorney, Agent, or Firm—Eugene N. Riddle

[57] ABSTRACT

A heat responsive safety device for a gate valve includes releasable locking means for the valve stem. The releasable locking means includes a movable member in engagement with the stem and a fusible material associated with the movable member. The fusible material is positioned within a chamber and a small diameter port communicates with the chamber. An outward bias of the stem places the fusible material under a compressive force and upon reaching a predetermined high temperature, the fusible material melts and is metered or leaked through the small diameter port thereby to permit movement of the movable member resulting in the release of the stem for movement of the gate valve to a closed position.

3 Claims, 6 Drawing Figures

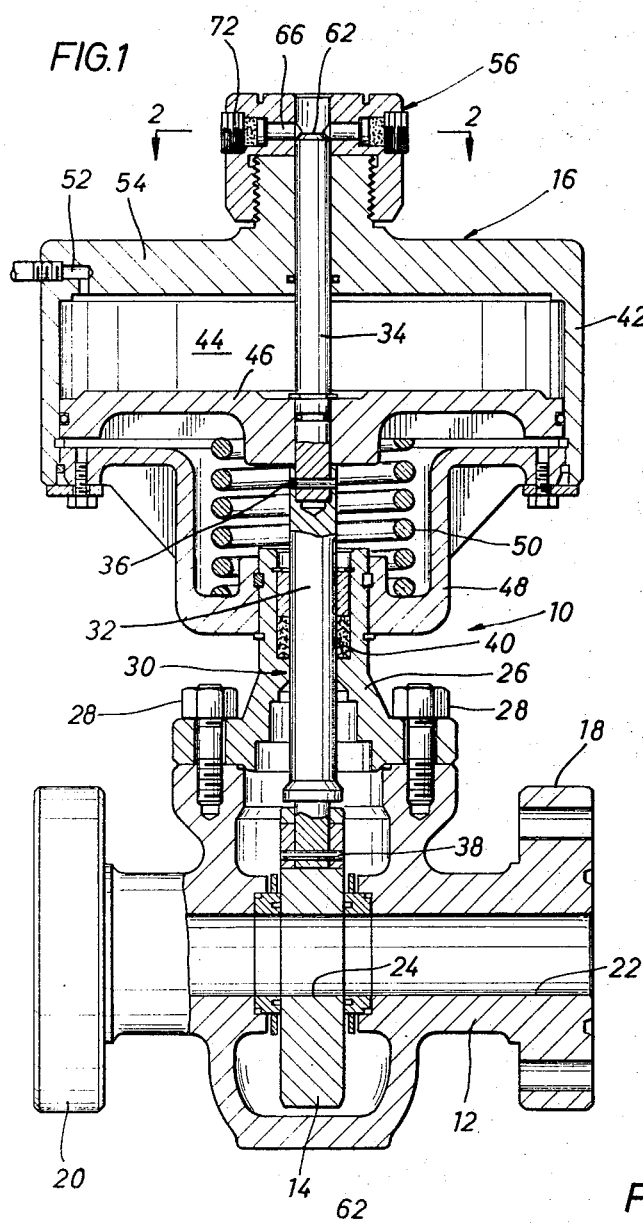

HEAT RESPONSIVE SAFETY DEVICE FOR GATE VALVES

BACKGROUND OF THE INVENTION

Heretofore, heat responsive safety valves have been employed with a fusible material for holding the valve in an open position. The fusible materials melt or fail at predetermined high temperatures and upon such deformation, the valve stem is normally released to permit the movement of an associated valve connected to the stem. For example, U.S. Pat. No. 705,572 dated July 29, 1902 discloses a valve having a valve stem extending therefrom in an abutting relation to a disk formed from a fusible material. Upon failure of the fusible material comprising the disk at a predetermined high temperature, the valve stem is urged upwardly to permit closure of the valve. Likewise, U.S. Pat. No. 3,659,624 dated May 2, 1972 shows a locking ring formed of a fusible material, such as lead or solder, with the locking ring effecting engagement of the valve stem about a groove. The locking ring fails at a predetermined desired temperature to release the valve stem and thereby permit movement of the valve to a closed position. Thus, the use of a fusible material which fails at a predetermined high temperature to permit actuation of a valve is well known in the art.

It is highly desirable to employ a safety device which may be actuated in a minimum of time upon the predetermined temperature being reached. For example, it is desired to provide a safety device which will fail within ten seconds or less after the predetermined temperature has been reached. With prior art devices such as described above, this has been very difficult to obtain as rupture of a fusible disk may depend on several conditions and may vary as much as 30 seconds to 1 minute after the predetermined temperature has been reached. Heretofore, the fusible material usually has been placed under a sheer condition which may have a preliminary failure resulting from decreased strength as the temperature is increased. For example, when a disk is placed in contact with the end of a valve stem, the spring force urging the valve stem upwardly may vary and the amount of spring force may determine the time, or at least affect the time, at which the fusible disk will fail after the predetermined temperature has been reached.

BRIEF DESCRIPTION OF THE PRESENT INVENTION

The present invention is directed to a heat responsive releasable locking means for a gate valve stem which is very sensitive to a predetermined high temperature and may be actuated, for example, within 10 seconds of the predetermined temperature being reached. The reaction time for the closing of a gate valve is maintained at a minimum by the present invention and is accomplished by the metering of the fusible material after the fusible material has melted. The fusible material is under compression resulting from the urging of the valve stem against the fusible material. A restricted port of small diameter communicates with the chamber for the fusible material and upon the melting of the fusible material in the chamber, a leakage or metering of the fusible material is effected through the port. Upon metering of the fusible material from the port, the locking means for the stem is released to permit movement of the valve to a closed position. The temperature at which the fusible material is fused or melts may be determined by the type of material employed and may be of a predetermined temperature range, such as between around 150° F and 350° F. The fusible material may, for example, be a combination of lead and tin, such as a low temperature solder sold under the trademark "Cerrocast." The melting point may be varied by changing the percentages of lead and tin.

The fire safety valve structure comprising the present invention includes a valve body, a valve movable between open and closed positions in the body, a stem on the valve having an outer end portion extending within a central opening, a heat responsive stem release means adjacent the central opening to maintain the valve in its open position and including a fusible material chamber communicating with the central opening. A releasable locking means holds the stem in an open position of the valve and the stem continuously exerts an outward compressive force against the fusible material. The fusible material upon reaching a predetermined high temperature melts and is forced by the stem force through the restricted diameter port thereby to permit release of the releasable locking means for movement of the valve to a closed position in a minimum of time after the predetermined temperature is reached. As long as a minimum stem thrust is provided, such as, for example, 600 pounds, the magnitude of such thrust does not vary the time of response for the release of the valve stem.

The invention accordingly comprises a construction hereinafter described, the scope of the invention being indicated in the following claims.

In the accompanying drawings, in which one of various possible embodiments of the invention is illustrated, FIG. 1 is a sectional view of a gate valve structure illustrating the gate and fluid actuator therefor with the heat responsive releasable means for the gate valve stem mounted on the fluid cylinder;

FIG. 2 is a top plan of the gate valve structure shown in FIG. 1;

FIG. 3 is an enlarged sectional view of a fragment of FIG. 1;

FIG. 4 is an enlarged sectional view similar to FIG. 3 but illustrating the releasable means in a position immediately after the fusible material has commenced melting;

FIG. 5 is a sectional view similar to FIGS. 3 and 4 but illustrating the releasable means after the valve stem has been released.

Figure 6:
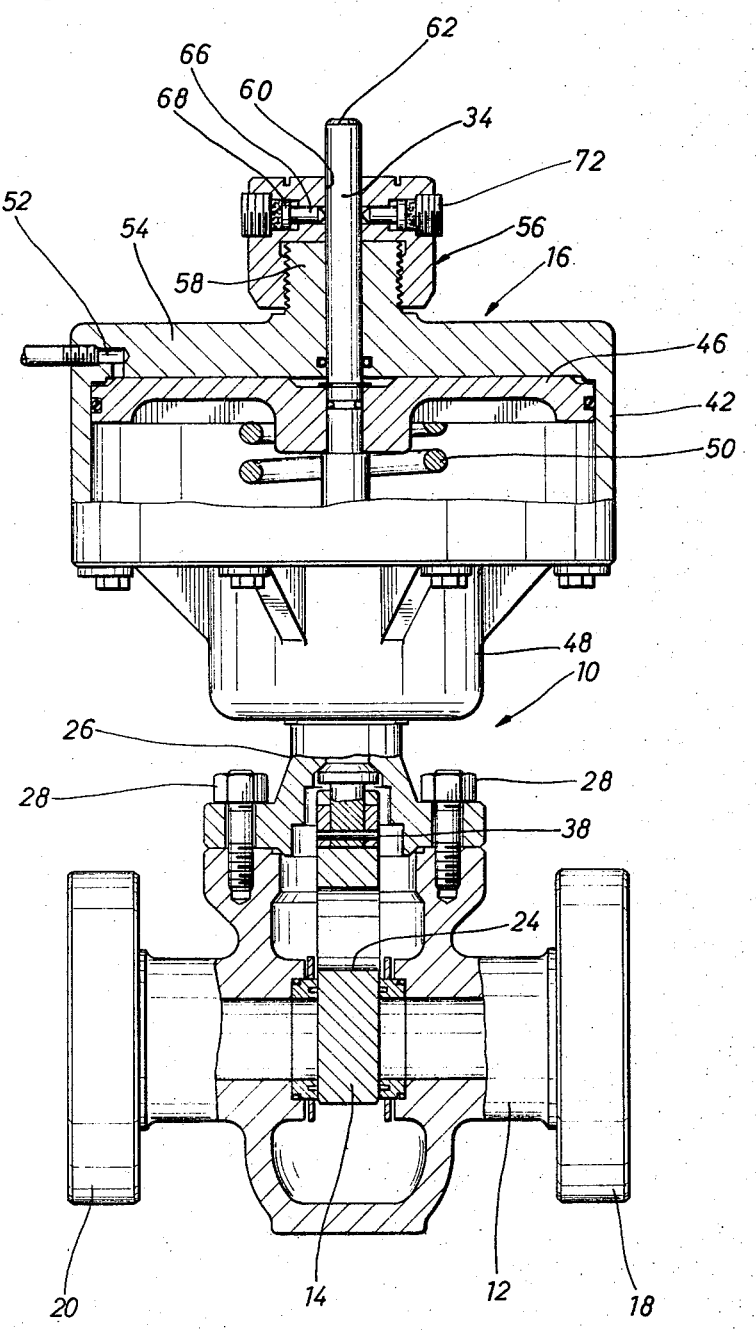
FIG. 6 is a sectional view of the gate valve structure similar to FIG. 1 but showing the gate moved to a closed position after the fusible material has melted and the valve stem has been released.

Referring to the drawings, the valve structure generally indicated 10 includes a valve body 12, a gate 14, and an actuator generally indicated 16 which moves gate 14 between open and closed positions. Body 12 has flanges 18 and 20 which are adapted to be connected to a flowline (not shown) and a bore 22 extends through body 12 in alignment with a port 24 in gate 14 when gate 14 is in open position.

A bonnet 26 is bolted at 28 to valve body 12. A valve stem generally indicated 30 has a lower stem portion 32 and an upper stem portion 34 connected thereto at pivot pin 36. Lower stem portion 32 is connected to gate 14 at pivot pin 38. A stem packing 40 in bonnet 26 extends about lower stem portion 32. Actuator 16 includes a cylinder 42 having a fluid chamber 44 and a piston 46 secured to upper stem portion 34 for movement therewith. Base 48 houses a spring 50 therein which engages the inner surface of piston 46 to urge continuously piston 46 to the upper position shown in FIG. 6. A suitable source of fluid may be provided through bore 52 in the upper portion of outer end wall 54 of cylinder 42. All of the above structure comprises conventional gate valve structure. It is to be understood that actuator 16 may be operated either by gas or liquid.

The present invention is directed particularly to a destructible or fusible cap 56. An extension 58 on the outer surface of the end wall 54 has external screw threads 55 and cap 56 is internally threaded to fit about external screw threads 55. A central opening 60 in cap 56 receives the extending end of stem 30 as shown in FIGS. 3 and 4. The upper end portion 34 of stem 30 is beveled at 62 at around a 45° angle with respect to the longitudinal axis of stem 30, for example. Angles between around 30° and 60° have been found to function satisfactorily. Lateral bores 64 having enlarged diameter portions 65 communicate with central opening 60 and a plunger 66 is mounted within each bore 64. Each plunger 66 has an enlarged shoulder or piston 68 thereon which is adapted to be seated against a shoulder 70 formed by each enlarged diameter portion 65. The enlarged diameter portion 65 forms a fusible material chamber adjacent each enlarged shoulder 68. A plug 72 having external screw threads 74 is threaded within internally threaded opening 76 adjacent the outer end of the enlarged diameter portion 65. Plug 72 has a small diameter port 78 extending therethrough and communicating with chamber 65. Port 78 should be of a sufficiently small diameter to prevent the cold extrusion of the eutectic material from chamber 65 into port 78.

Material chamber 65 contains an autectic material which may preferably be an alloy of bismuth and tin. The melting temperature of the eutectic may be within the range of 150° F to 450° F. For example, if an alloy is employed containing 40 percent bismuth and 60 percent tin, the eutectic material has a yield temperature of around 300° F and would commence melting or creeping at around 280° F. Port 78 may be an optimum of around 3/64 inch but may range between 1/64 inch to ⅛ inch when an alloy comprising 40 percent bismuth and 60 percent tin is employed. The diameter of ports 78 will determine the reaction time required for the valve to close after the predetermined temperature is reached. The temperature at which the eutectic material fails may be varied depending on such factors as, for example, the specific alloy employed, the time the alloy is exposed to the temperature and the rate of increase in the temperature. It is to be understood that an alloy of tin and bismuth is selected to accommodate the difference in temperature between the outside temperature and the temperature of the eutectic chamber. The term "fusible material" as employed herein is interpreted as a material or substance which changes from a solid state to a liquid state upon reaching a predetermined high temperature.

Plungers 66 have extending beveled edges 80 which engage the upper surface 62 of stem 34 to hold stem 34 in the open position of gate 14 as shown in FIG. 1.

Upon melting of the eutectic within chambers 65, the thrust exerted by spring 50 against piston 46 and stem 34 urges enlarged portion 68 against the eutectic material to force the eutectic material from chamber 65 out through ports 78 and metering plugs 72. Upon the volume being decreased in chambers 65, plungers 66 may move outwardly out of engagement with the upper edge portion 62 of stem 34 to permit gate 14 to move to a closed position as shown in FIG. 6. Large volumes of the eutectic material are not necessary since the material is not in sheer, tension, bending or any other stress condition except compression which results from the urging of spring 50. A stem thrust of around 600 to 800 pounds force is provided to force the eutectic material through ports 78 within a minimum of time, such as 5 seconds, after the predetermined temperature has been reached, assuming a slow rate of increase in temperature has been provided. Stem thrusts as low as 100 pounds would be satisfactory, however, on reaching the temperature at which the eutectic material melts, the eutectic material passes from a solid state in compression to a liquid which is leaked through ports 78 in metering plugs 72.

What is claimed is:

1. A fire safety valve structure comprising a valve body, a gate valve movable between open and closed positions in said body, a cylindrical housing on the valve body having a piston member mounted therein, a stem connected to said piston member and the gate valve and movable therewith, said cylindrical housing having an axially extending central opening, said stem having an outer end portion extending within the central opening, means continuously biasing the piston member and stem toward the closed position of the valve, and heat responsive stem release means on said housing adjacent said central opening to maintain the valve in its open position, said stem release means including at least two fusible material chambers each having a fusible material confined therein, a piston mounted within each chamber for movement in a direction generally transversely of the longitudinal axis of the stem upon melting of the fusible material and engaging the fusible material across substantially the entire surface of the fusible material adjacent the piston, the pistons holding the stem in an open position of the valve and being continuously urged by said stem against the fusible material in said chambers to place the fusible material under a substantially wholly compressive loading, and a metering opening of a restricted size communicating with each chamber, the wall surfaces defining said chambers being in contact with the entire adjacent surface of the fusible material except the portion of the fusible material exposed to the metering openings, said fusible material upon reaching a predetermined high temperature melting across substantially its entire cross section and being forced into said metering openings from the compressive forces exerted by the pistons against the confined fusible material thereby to permit a simultaneous movement of the pistons to release the stem for movement of the gate valve to a closed position.

2. A gate valve actuator as set forth in claim 1 wherein said metering opening has a diameter between around 1/64 inch and 4/32 inch, and said fusible material melts at a temperature over around 150° F.

3. A fire safety valve structure comprising a valve body, a gate valve movable between open and closed positions in said body, a cylindrical housing on the valve body having a piston member mounted therein, a stem connected to said piston member and the gate valve and movable therewith, said cylindrical housing having a threaded extension thereon with a central opening, said stem having an outer end portion extending within the central opening, spring means continuously biasing the piston member and stem toward the closed position of the valve, and heat responsive stem release means threaded on said extension adjacent said central opening to maintain the valve in its open position, said stem release means including a fusible material chamber having a fusible material therein, a piston mounted for movement within the chamber upon melting of the fusible material and engaging the fusible material across substantially the entire surface of the fusible material adjacent thepiston, said piston holding the stem in an open position of the valve and being continuously urged by said stem in a direction perpendicularly to the longitudinal axis of the stem against the fusible material in said chamber to place the fusible material under a substantially wholly compressive loading, a metering plug positioned in opposed relation to said piston to define an end of said material chamber and having a metering port therein of a restricted size communicating with said chamber, said metering plug being threaded onto said clindrical housing, said fusible material upon reaching a predetermined high temperature melting and being forced into said metering port from the compressive forces exerted by the piston and the stem thereby to permit movement of the piston to release the stem for movement of the gate valve to a closed position.

* * * * *